(12) United States Patent
Iwata

(10) Patent No.: US 9,122,478 B2
(45) Date of Patent: Sep. 1, 2015

(54) POWER SUPPLY AND ASSOCIATED METHODOLOGY OF SEQUENTIAL SHUTDOWN AN INFORMATION PROCESSING SYSTEM BY UTILIZING A VIRTUALIZATION MANAGEMENT FUNCTION OF THE POWER SUPPLY

(75) Inventor: Tetsuki Iwata, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 653 days.

(21) Appl. No.: 13/396,063

(22) Filed: Feb. 14, 2012

(65) Prior Publication Data
US 2012/0233474 A1 Sep. 13, 2012

(30) Foreign Application Priority Data

Mar. 10, 2011 (JP) ................................. 2011-053289

(51) Int. Cl.
G06F 1/00 (2006.01)
G06F 1/32 (2006.01)
G06F 9/50 (2006.01)
G06F 9/455 (2006.01)

(52) U.S. Cl.
CPC .......... *G06F 1/3203* (2013.01); *G06F 9/45533* (2013.01); *G06F 9/5077* (2013.01); *Y02B 60/146* (2013.01)

(58) Field of Classification Search
CPC ........................... G06F 9/45533; G06F 9/5077
See application file for complete search history.

(56) References Cited

U.S. PATENT DOCUMENTS

| 2008/0065919 | A1* | 3/2008 | Hatasaki et al. ............... 713/324 |
| 2010/0088699 | A1* | 4/2010 | Sasaki ................................ 718/1 |
| 2010/0306560 | A1* | 12/2010 | Bozek et al. ................... 713/320 |
| 2011/0004878 | A1* | 1/2011 | Divoux .............................. 718/1 |
| 2011/0161695 | A1* | 6/2011 | Okita et al. .................... 713/310 |
| 2011/0167421 | A1* | 7/2011 | Soundararajan et al. ......... 718/1 |
| 2012/0036383 | A1 | 2/2012 | Iwata |
| 2012/0102492 | A1 | 4/2012 | Iwata |

FOREIGN PATENT DOCUMENTS

| JP | 2004-259030 A | 9/2004 |
| JP | 2008-269249 | 11/2008 |
| JP | 2009-245316 A | 10/2009 |

(Continued)

OTHER PUBLICATIONS

"Running VirtualCenter in a virtual Machine", VirtualCenter 2.X, WMWARE Technical Note, [online], internet >URL: http://www.wmware.com/pdf/vi3_vc_vm.pdf>, Jan. 7, 2011, 6 pages.

(Continued)

*Primary Examiner* — Thomas Lee
*Assistant Examiner* — Zhipeng Wang
(74) *Attorney, Agent, or Firm* — Oblon, McClelland, Maier & Neustadt, L.L.P.

(57) ABSTRACT

A first power supply is configured to feed power to a computer. The power supply includes a virtual machine management unit configured to transmit an instruction to any one of a second virtual host that is executed on the computer and a fourth virtual machine that is run in the second virtual host. Here, the fourth virtual machine is configured to control a virtualization management system including virtual hosts different from the second virtual host.

4 Claims, 9 Drawing Sheets

(56) References Cited

FOREIGN PATENT DOCUMENTS

| | | |
|---|---|---|
| JP | 2009-282714 A | 12/2009 |
| JP | 2010-262382 A | 11/2010 |

OTHER PUBLICATIONS

Office Action issued Jun. 3, 2014, in Japanese Patent Application No. 2011-053289 with English translation.

* cited by examiner

FIG. 7A

| POWER SUPPLY IDENTIFIER | OUTLET IDENTIFIER | VIRTUAL HOST |
|---|---|---|
| FIRST POWER SUPPLY | FIRST OUTLET | FIRST VIRTUAL HOST |
| | SECOND OUTLET | SECOND VIRTUAL HOST |

| VIRTUAL MACHINE | OS | ADDRESS | NET MASK | USER | PASSWORD |
|---|---|---|---|---|---|
| FIRST VIRTUAL MACHINE | OS_A | 192.168.1.1 | 24 | root | password |
| SECOND VIRTUAL MACHINE | OS_A | 192.168.1.2 | 24 | root | password |
| THIRD VIRTUAL MACHINE | OS_A | 192.168.1.3 | 24 | root | password |
| FOURTH VIRTUAL MACHINE | OS_A | 192.168.1.4 | 24 | root | password |

| POWER SUPPLY IDENTIFIER | POWER SUPPLY'S ON/OFF | OUTLET IDENTIFIER | VIRTUAL HOST | TYPE | INPUT VOLTAGE | INPU FREQUENCY | OUTPUT VOLTAGE | OUTPUT FREQUENCY |
|---|---|---|---|---|---|---|---|---|
| FIRST POWER SUPPLY | ON | FIRST OUTLET | FIRST VIRTUAL HOST | UPS | 100V | 50H | 100V | 50Hz |
| | | SECOND OUTLET | SECOND VIRTUAL HOST | UPS | 100V | 50H | 100V | 50Hz |

| VIRTUAL HOST IDENTIFIER | VIRTUAL MACHINE IDENTIFIER | NUMBER OF CPU | CPU CLOCK | MEMORY CAPACITY | NETWORK BANDWIDTH |
|---|---|---|---|---|---|
| FIRST VIRTUAL HOST | FIRST VIRTUAL MACHINE | 2 | 3GHz | 4GBytes | 1Gbps |
| | SECOND VIRTUAL MACHINE | 2 | 3GHz | 4GBytes | 1Gbps |
| | THIRD VIRTUAL MACHINE | 2 | 3GHz | 4GBytes | 1Gbps |
| SECOND VIRTUAL HOST | FOURTH VIRTUAL MACHINE | 2 | 3GHz | 4GBytes | 1Gbps |

| INSTRUCTION TARGET | IDENTIFIER OF INSTRUCTION TARGET | DESIRED TIME EXECUTION TIMING | CONTENT OF COMMAND TO BE EXECUTED |
|---|---|---|---|
| VIRTUAL MACHINE | FIRST VIRTUAL MACHINE | 1:00 | OS REBOOT |
| | SECOND VIRTUAL MACHINE | 1:30 | LOG CLEAR |
| | THIRD VIRTUAL MACHINE | 2:00 | BACKUP |
| | FOURTH VIRTUAL MACHINE | - | - |
| VIRTUAL HOST | FIRST VIRTUAL HOST | - | - |
| | SECOND VIRTUAL HOST | - | - |

23b

POWER SUPPLY AND ASSOCIATED METHODOLOGY OF SEQUENTIAL SHUTDOWN AN INFORMATION PROCESSING SYSTEM BY UTILIZING A VIRTUALIZATION MANAGEMENT FUNCTION OF THE POWER SUPPLY

CROSS-REFERENCE TO RELATED APPLICATIONS

This application is based upon and claims the benefit of priority from the prior Japanese patent Application No. 2011-053289 (filed Mar. 10, 2011); the entire contents of which are incorporated herein by reference.

BACKGROUND OF THE INVENTION

1. Field of the Invention

The present invention relates to a power supply for feeding power to a computer, and a control method of the power supply.

2. Description of the Related Art

Virtualization management is generally used for effective utilization of the resources of physical computers. The virtualization management uses the physical computers as virtual hosts. Each virtual host is configured to run one or multiple virtual machines (VMs) in emulation. In the virtualization management, a VM is sometimes migrated to a different virtual host depending upon the running situations of the VMs. Using a structure that allows flexible migration of a VM to any virtual host makes it possible to effectively utilize the resources of the physical computers.

Meanwhile, there are methods that use a power control device to reduce the power consumption of the physical computers (see Japanese Patent Application Publication No. 2008-269249, for example). In the method described in Japanese Patent Application Publication No. 2008-269249, the power control device collects the load statuses of systems, migrates a system to a given physical computer on the basis of the load statuses, and turns off the power of the unselected physical computer. By causing the power control device to perform both virtualization management and power management as described above, the power consumption of the physical computers can be expected to be reduced.

Meanwhile, a virtual system including virtual hosts and VMs may include a virtualization management server in some cases. The virtualization management server is configured to control the virtual hosts and the VMs of the virtual system. Such a virtualization management server is generally a physical server, and therefore the resources of the virtualization management server such as the number of CPUs and a memory are the same as the resources of the physical server. Accordingly, increasing or decreasing the resources of the virtualization management server requires increasing or decreasing the physical resources. However, there is a method in which the virtualization management server is run on a virtual host, and multiple physical servers are used to change the resources of the virtualization management server as needed (vmware, "Running VirtualCenter in a Virtual Machine," [online], internet <URL: http://www.vmware.com/pdf/vi3_vc_in_vm.pdf> [searched on Jan. 7, 2011]).

SUMMARY OF THE INVENTION

However, the method described in Japanese Patent Application Publication No. 2008-269249 has a problem that the power control device becomes unable to perform not only the power management but also the virtualization management if there is a power fault in the power supply feeding power to the power control device.

Moreover, in the method described in Japanese Patent Application Publication No. 2008-269249, if power is fed separately to the power control device and the physical computers, it may be difficult to safely shut down both the power control device and the physical computers in the event of an accidental blackout or a planned blackout. Specifically, in shutdown, the virtualization management server must be shut down after confirming that the virtual system is shut down. To be able to perform shutdown in this order, settings needs to be made for each individual components. Applying such settings to all the components of a system may be considered difficult if the system is a system of a certain scale such as a large-scale system or a medium-scale system. Moreover, although applying the settings may be considered possible in a case of a small-scale system, doing so involves troublesome works.

Further, if the virtualization management is performed without synchronization with the ON/OFF of the powers of the physical computers, there may be a case where the power control device attempts to migrate a VM to a physical computer whose power is off. The method described in Japanese Patent Application Publication No. 2008-269249 also has a possibility that a power supply is turned on or off by an event or an operation other than the control by the power control device such as an accidental blackout or a manual operation of turning on or off the power supplies. For this reason, as in the case of the virtualization management without synchronization, the power control device may attempt to migrate a VM to a physical computer whose power is off, thereby causing an error.

Moreover, in the method described in "Running VirtualCenter in a Virtual Machine," since the virtualization management server is implemented on a virtual host, the virtualization management server performs virtualization management for the virtualization management server itself, which is not appropriate. Specifically, when the function of the virtualization management server implemented on the VM is to be stopped, the virtualization management server transmits a message about the stopping of the function. However, the virtualization management server cannot transmit a response message to the stopping of the function, and therefore it is impossible to confirm that the function has been stopped.

Due to such circumstances, a development of a technique to improve the reliability of virtualization management has been expected.

Therefore, an object of the present invention is to provide a power supply and a control method thereof which are capable of improving the reliability of virtualization management.

In order to achieve the above object, the first characteristic of the present invention is related to the power supply for feeding power to a computer. The power supply according to the first characteristic of the present invention comprising a virtual machine management unit configured to transmit an instruction to any one of a virtual host that is executed on the computer, and a virtual machine that is run in emulation in the virtual host, wherein the virtual machine controls a virtualization management system including a virtual host different from the virtual host.

The second characteristic of the present invention is related to the control method of a power supply for feeding power to a computer. The control method of the power supply according to the second characteristic of the present invention includes the steps of: transmitting an instruction to any one a virtual host that is executed on the computer and a virtual machine that is run in emulation in the virtual host, wherein the virtual machine controls a virtualization management system including a virtual host different from the virtual host.

BRIEF DESCRIPTION OF THE DRAWINGS

FIG. 7A is a diagram for describing an example of the data structure of connection data and pieces of data therein, the connection data being part of management target data in the power supply of the embodiment of the present invention.

FIG. 7B is a diagram for describing an example of the data structure of VM data and pieces of data therein, the VM data being part of the management target data in the power supply of the embodiment of the present invention.

FIG. 8 is a diagram for describing an example of the data structure of power data and pieces of data therein, the power data being included in power management data in the power supply of the embodiment of the present invention.

FIG. 9 is a diagram for describing an example of the data structure of resource data and pieces of data therein, the resource data being included in VM management data in the power supply of the embodiment of the present invention.

FIG. 10 is a diagram for describing an example of the data structure of desired instruction data and pieces of data therein, the desired instruction data being included in the VM management data in the power supply of the embodiment of the present invention.

DETAILED DESCRIPTION OF THE PREFERRED EMBODIMENT

Figure 1:
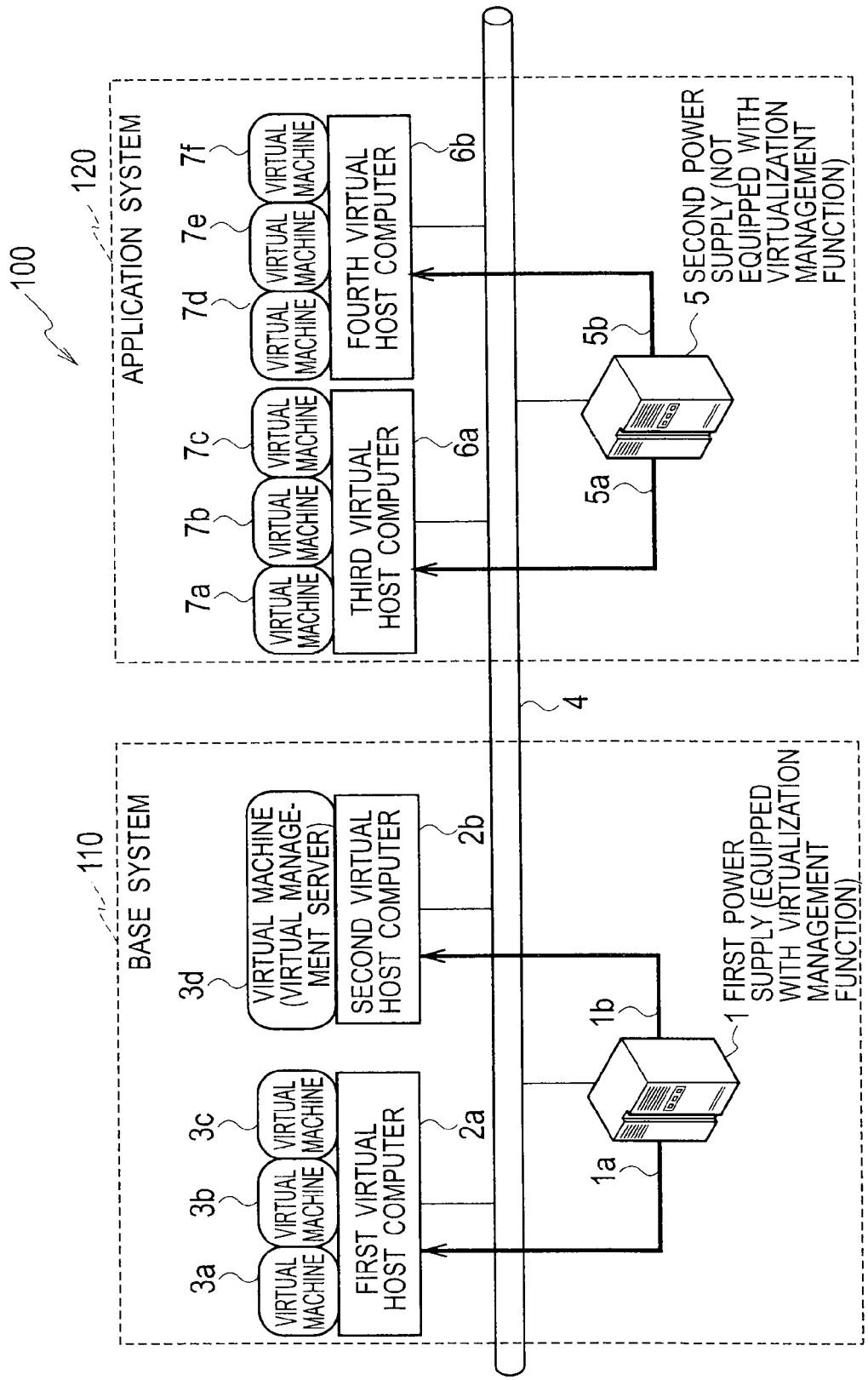
FIG. 1 is a system configuration diagram for describing an information processing system of an embodiment of the present invention.

Embodiments of the present invention will be described next with reference to the drawings. In the following description of the drawings, the same or similar portions are denoted by the same or similar reference signs.

First of all, in the embodiments of the present invention, a "physical computer" is a general computer including a central processing unit (CPU), a storage device, and the like. Specifically, a "physical computer" is a computer such as a personal computer, a server, or a blade server. Moreover, a "virtual host" is implemented on a physical computer by executing a host OS on the physical computer. One virtual host can run one or more VMs. A "VM" is a virtual computer obtained by emulating another computer as software on one virtual host.

A "virtual system" includes a physical computer, a physical storage, a physical network, and the like. The whole virtual system functions as one or more VMs. "Virtualization management" manages virtual infrastructures constructing a virtual system and controls the running of one or more VMs. The control by the virtualization management may result in migration of a VM to a different virtual host.

A "power supply" is an apparatus configured to feed power to virtual infrastructures, as well as to measure and cut the power. Specifically, a "power supply" is an alternating current (AC) power supply, a direct current (DC) power supply, an uninterruptible power supply (UPS), a power distribution unit (PDU), or the like.

"Power management" is control that allows stable feed of power to infrastructures. Power management in the embodiments of the present invention refers mainly to four functions. First is a function to protect services and data by automatically shutting down the powers of infrastructures such as computers, storages, and a network in the event of inspection of power equipment or a power fault. Second is a function to reduce the power consumption by shutting down the infrastructures in accordance with a predetermined schedule. Third is a function to execute stop, boot, or reboot of the powers or any combination of these through remote control in accordance with a predetermined procedure, in a case where a hardware reset is necessary due to an infrastructure fault or the like. Fourth is a function to execute a predetermined command, which does not involve the turning on and off of the powers, in accordance with a schedule or through remote control. The power management is implemented by the power supply and is set corresponding to the environment.

"Shutdown" refers to at least one of shutdown of the OS, suspend, standby, and power disconnection.

Embodiment

First, an overview of an information processing system 100 of an embodiment of the present invention will be described with reference to FIG. 1. The information processing system 100 of the embodiment of the present invention includes a base system 110 and an application system 120. Each of the base system 110 and the application system 120 includes physical computers and a power supply configured to feed power to the physical computers. The devices of the base system 110 and the application system 120 are capable of mutual communications through a communication network 4. The example shown in FIG. 1 describes a case where each of the base system 110 and the application system 120 includes one power supply. However, multiple power supplies may be connected.

The base system 110 is a virtual system configured to be controlled by a virtualization management function of a first power supply 1. Functions of the base system 110 are executed by VMs 3 run in emulation by virtual host computers 2 of the base system 110. The base system 110 includes the first power supply 1, a first virtual host computer 2a and a second virtual host computer 2b. The number of virtual host computers 2 provided to the base system 110 may be one, or three or more.

The first power supply 1 of the base system 110 has a virtualization management function. The first power supply 1 is configured to feed power to the first virtual host computer 2a through a first outlet 1a and to the second virtual host computer 2b through a second outlet 1b. Moreover, the first power supply 1 is connected to the communication network 4 through a communication control device, and is connected to the first and second virtual host computers 2a and 2b to be capable of mutual communications therebetween. Furthermore, the first power supply 1 is connected to the devices of the application system 120 to be capable of mutual communications therebetween.

Each virtual host computer 2 is configured to run one or more VMs 3 in emulation. In the example shown in FIG. 1, the first virtual host computer 2a runs three VMs 3a, 3b, and 3c (first, second and third VMs 3a, 3b, and 3c) in emulation.

Moreover, the second virtual host computer 2b runs one VM 3d (fourth VM 3d) in emulation. The virtualization management function of the first power supply 1 controls these VMs 3.

The base system 110 is a system which implements functions serving as a basis for executing functions of the application system 120. The base system 110 implements various functions of a DNS server, a DHCP server, a directory server, and the like by using the VMs 3. In the embodiment of the present invention, the application system 120 is implemented by means of a virtual system. Moreover, the base system 110 implements the function of a virtualization management server which controls the virtualization management of the application system 120. In the example shown in FIG. 1, the fourth VM 3d controls the virtualization management of the application system 120.

As described above, the fourth VM 3d performs the virtualization management of the application system 120. Thus, when the second virtual host computer 2b running the fourth VM 3d in emulation is to be shut down, the fourth VM 3d first shuts down the functions of the application system 120, and thereafter the second virtual host computer 2b is shut down.

Various functions of the base system 110 are required at the time of booting the application system 120. Thus, these various functions must be implemented before the booting of the devices of the application system 120. Specifically, the devices of the application system 120 are booted after the functions of the base system 110 are activated. In this event, the devices of the application system 120 are assigned with IP addresses from the DHCP server of the base system 110, managed by the directory server of the base system 110, and so on. Upon booting of the devices of the application system 120, the functions of the application system 120 are implemented on the VMs. In this event, the VMs of the application system 120 are controlled by the virtualization management server of the base system 110.

The application system 120 is a virtual system configured to be controlled by the virtualization management function emulated by the virtual host 2 of the base system 110. The functions of the application system 120 are executed by VMs 7 run in emulation by virtual host computers 6 of the application system 120. The application system 120 includes a second power supply 5, a third virtual host computer 6a, and a fourth virtual host computer 6b. The number of virtual host computers 6 provided to the application system 120 may be one, or three or more.

Unlike the first power supply 1 of the base system 110, the second power supply 5 of the application system 120 may be a general power supply with no virtualization management function. The second power supply 5 is configured to feed power to the third virtual host computer 6a through a first outlet 5a and to the fourth virtual host computer 6b through a second outlet 5b. Moreover, the second power supply 5 is connected to the communication network 4 through a communication control device, and is connected to the third and fourth virtual host computers 6a and 6b to be capable of mutual communications therebetween.

The example shown in FIG. 1 describes a case where the second power supply 5 feeds power to the computers of the application system 120, but the first power supply 1 may feed power to the computers. Note that instead of the first power supply 1, the fourth VM 3d whose virtualization management is performed by the first power supply 1 performs the virtualization management of the application system 120.

Each host computer 6 is configured to run one or more VMs 7 in emulation. In the example shown in FIG. 1, the third virtual host computer 6a runs three VMs 7a, 7b, and 7c. The fourth virtual host computer 6b runs three VMs 7d, 7e, and 7f.

These VMs 7 are controlled by the virtualization management function of the fourth VM 3d of the base system 110.

The application system 120 is a virtual system configured to be controlled by the virtualization management function of the virtualization management server of the base system 110. The functions of the application system 120 are executed by the VMs 7 run in emulation by the virtual host computers 6 of the application system 120.

The application system 120 is a business system, an online shopping system, or the like, for example. The application system 120 is implemented by using an infrastructure system implemented by the base system 110. At the time of booting, the virtual host computers 6, the VMs 7, and the like of the application system 120 utilize functions of the base system 110. Specifically, when establishing a connection to the communication network 4, the virtual host computers 6 of the application system 120 utilize the various functions of the DNS server, DHCP server, directory server, and the like of the base system 110. Moreover, when the VMs 7 are run in emulation by the virtual host computer 6, this emulation is controlled by the function of the virtualization management server of the base system 110.

Figure 2:
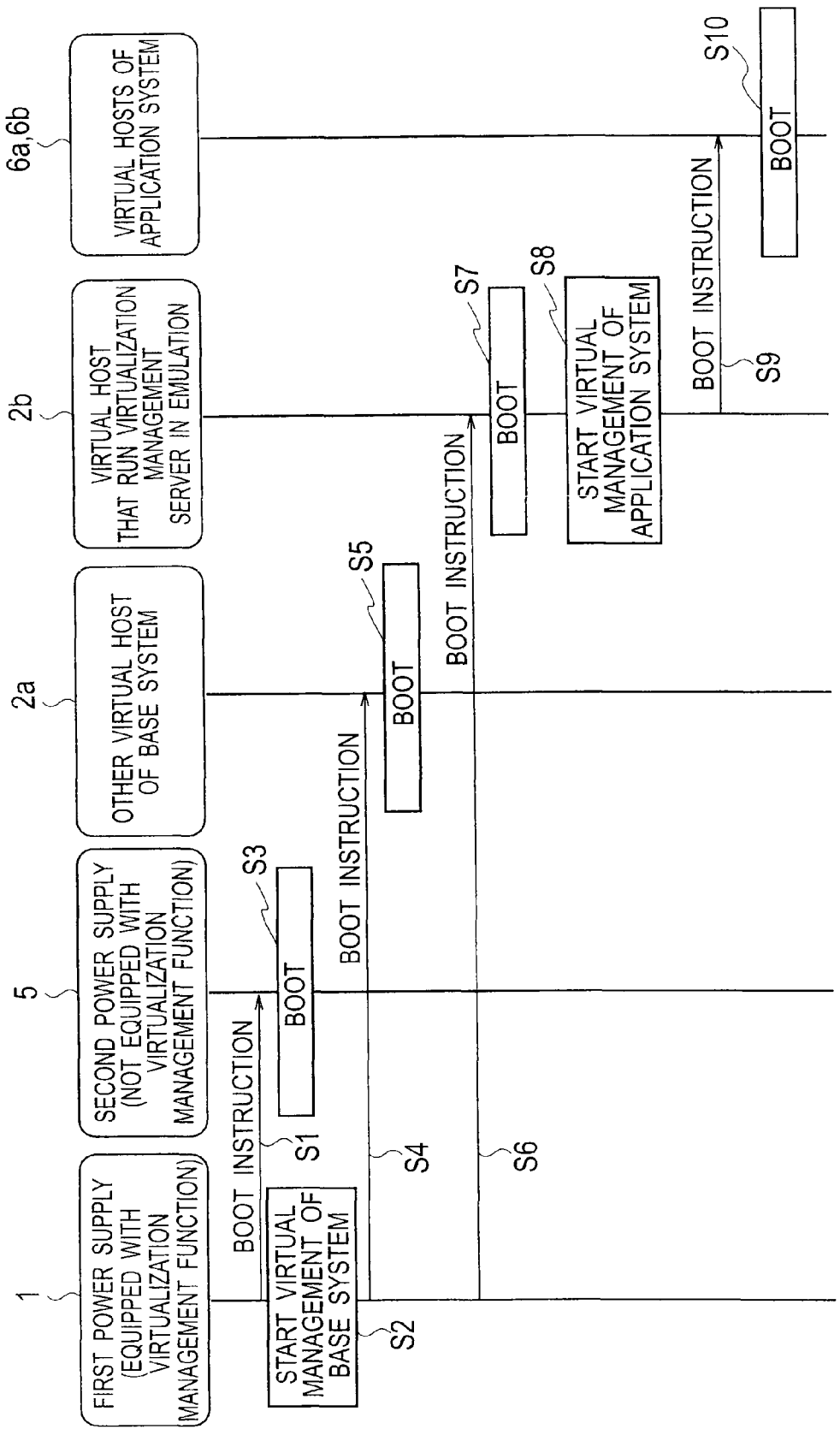
FIG. 2 is a diagram for describing processing performed at the time of booting the information processing system.

Referring to FIG. 2, description will be given of processing performed at the time of booting the information processing system 100 of the embodiment of the present invention. FIG. 2 describes processing for booting the devices of the information processing system 100 from a state where all the devices are powered off. The information processing system 100 is booted mainly by control performed by the first power supply 1. Here, the first power supply 1 is in a state of being already booted by an operation such as pushing its power button by the operator, for example.

First, in step S1, the first power supply 1 transmits an instruction to boot the second power supply 5. In step S2, the first power supply 1 starts the virtualization management of the base system 110. In step S3, the second power supply 5 is booted by following the boot instruction transmitted from the first power supply 1 in step S1. Here, the second power supply 5 may be booted by causing the operator to push its power button, as in the case of the first power supply 1.

In steps S4 to S7, the first power supply 1 boots the devices of the base system 110.

For instance, in the example shown in FIG. 2, in steps S4 and S5, the first virtual host 2a is booted as the first power supply 1 transmits a boot instruction to the virtual host other than the second virtual host 2b that runs the virtualization management server in emulation, i.e., the first virtual host 2a. Then, in steps S6 and S7, the second virtual host 2b is booted as the first power supply 1 transmits a boot instruction to the second virtual host 2b that runs the virtualization management server in emulation.

Here, the second virtual host 2b that runs the virtualization management server in emulation is booted, and the virtualization management of the base system 110 by the first power supply 1 starts. In this event, in step S8, the fourth VM 3d starts the virtualization management of the application system 120. The fourth VM 3d controls the virtualization management of the applications system 120. Note that the second virtual host 2b runs the fourth VM 3d in emulation.

In steps S9 and S10, the second virtual host 2b transmits an instruction to boot the virtual hosts 6 of the applications system 120. As a result, the virtual hosts 6 of the application system 120 are booted.

In the example of FIG. 2, the first virtual host 2a of the base system is booted, and thereafter the second virtual host 2b that runs the virtualization management server in emulation is booted. However, the booting is not limited to this order.

Moreover, the booting order may be determined based on software that runs on the application system 120 and software of the virtualization management server that is emulated on the application system 120. The information processing system 100 of the embodiment of the present invention only needs to be such that the first power supply 1 equipped with the virtualization management function can feed power to the second virtual host computer 2b, which runs the virtualization management server in emulation, and also perform the virtualization management thereof, and that the virtualization management function of the second virtual host computer 2b can effect the virtualization management of the application system 120.

Meanwhile, in the example of FIG. 2, the first power supply 1 may proceed to the process of step S4 after confirming that the virtualization management of the base system 110 is started in step S2. Also, the first power supply 1 may transmit a boot instruction to the second power supply 5 in step S1 and a boot instruction to the virtual host of the base system 110 other than the second virtual host 2b, i.e., the first virtual host 2a, in step S4, and thereafter sequentially inquire whether the booting of the second power supply 5 and the first virtual host 2a is complete. The first power supply 1 may proceed to the process of step S7 after confirming that the booting of the second power supply 5 and the first virtual host 2a is complete. Similarly, the second virtual host 2b may proceed to the process of step S9 after confirming that the virtualization management of the application system 120 is started in step S8.

In FIG. 2, description has been given of a case where the first power supply 1 boots the base system 110, and the second virtual host 2b boots the application system 120 on the basis of the control by the first power supply 1. Now, referring to FIG. 3, description will be given of a case where the second virtual host 2b boots the application system 120 on the basis of control by the first power supply 1 from a state where the base system 110 has already been booted. Here, the first virtual host computer 2a of the base system 110 has already been booted, and the first power supply 1 has already started the virtualization management of the base system 110.

First, in step S21, the first power supply 1 transmits an instruction to boot the second power supply 5. In step S22, the second power supply 5 is booted by following the boot instruction transmitted from the first power supply 1 in step S21. Here, the second power supply 5 may be booted by causing the operator to push its power button, as in the case of the first power supply 1.

Then, in steps S23 and S24, the second virtual host 2b is booted as the first power supply 1 transmits a boot instruction to the second virtual host 2b that runs the virtualization management server in emulation.

In this event, the second virtual host 2b that runs the virtualization management server in emulation is booted, and the virtualization management of the base system 110 by the first power supply 1 starts. Thereafter, in step S25, the fourth VM 3d run in emulation by the second virtual host 2b starts the virtualization management of the application system 120. The fourth VM 3d controls the virtualization management of the application system 120.

In steps S26 and S27, the virtual hosts 6 of the application system 120 are booted as the second virtual host 2b transmits an instruction to boot the virtual hosts 6 of the application system 120.

Figure 3:
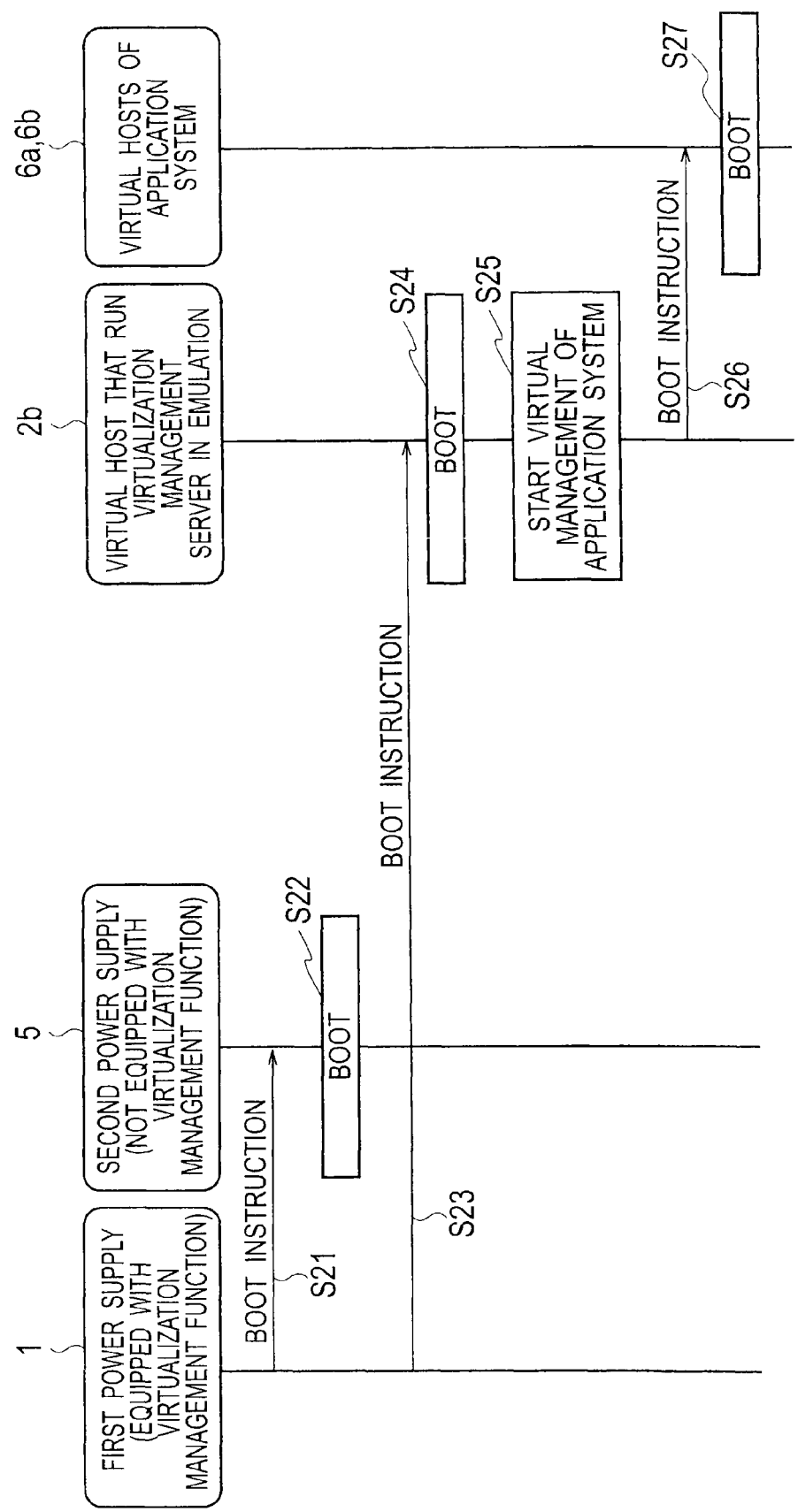
FIG. 3 is a diagram for describing processing performed at the time of booting an application system.

In the example of FIG. 3, the second power supply 5 that feeds power to each server of the application system 120 is booted, and thereafter the second virtual host 2b that runs the virtualization management server in emulation is booted. However, the booting is not limited to this order. Moreover, the booting order may be determined based on the software that runs on the application system 120 and the software of the virtualization management server that is emulated on the application system 120. The information processing system 100 of the embodiment of the present invention only needs to be such that the first power supply 1 equipped with the virtualization management function can feed power to the second virtual host computer 2b, which runs the virtualization management server in emulation, and also perform the virtualization management thereof, and that the virtualization management function of the second virtual host computer 2b can effect the virtualization management of the application system 120.

Meanwhile, in the example of FIG. 3, the first power supply 1 may transmit a boot instruction to the second power supply 5 in step S21, and thereafter inquire whether the booting of the second power supply 5 is complete. The first power supply 1 may proceed to the process of step S23 after confirming that the booting of the second power supply 5 is complete. Similarly, the second virtual host 2b may proceed to the process of step S26 after confirming that the virtualization management of the application system 120 is started in step S25.

Here, in the example shown in FIG. 3, the processes of the steps S24 and S25 may be omitted if the fourth VM 3d is to be booted with the second power supply 5 shut down.

Figure 4:
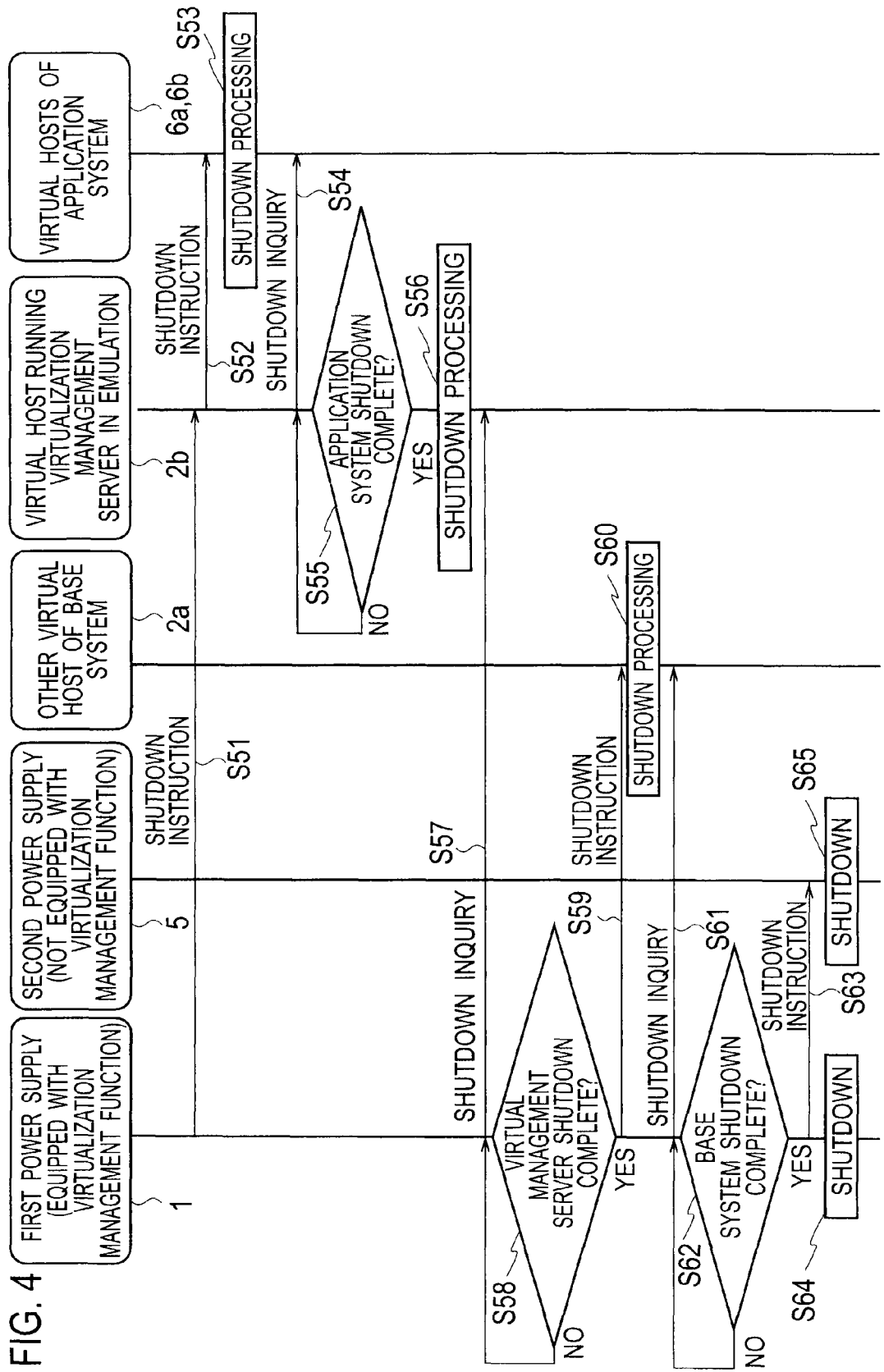
FIG. 4 is a diagram for describing processing performed at the time of shutting down the information processing system.

Referring to FIG. 4, description will be given of processing performed at the time of shutting down the information processing system 100 of the embodiment of the present invention. FIG. 4 describes processing for shutting down the devices of the information processing system 100 from a state where all the devices have been booted.

First, in step S51, the first power supply 1 transmits a shutdown instruction to the second virtual host 2b running the virtualization management server in emulation. In step S52, the second virtual host 2b transmits a shutdown instruction to the virtual hosts 6 of the application system 120 which the second virtual host 2b is performing virtualization management on. In step S53, the virtual hosts 6 start shutdown processing.

Thereafter, in step S54, the second virtual host 2b sequentially inquires the virtual hosts 6 and judges in step S55 whether or not the virtual hosts 6 of the application system 120 are shut down. If the application system 120 is not yet shut down, the second virtual host 2b returns to step S54 and transmits an inquiry for confirming the shutdown of the application system 120. On the other hand, if the shutdown of the application system 120 is confirmed, then in step S56, the second virtual host 2b running the virtualization management server in emulation starts its own shutdown processing.

The first power supply 1 proceeds to step S57 after transmitting in step S51 the shutdown instruction to the second virtual host 2b running the virtualization management server in emulation. In step S57, the first power supply 1 inquires the second virtual host 2b. In step S58, the first power supply 1 judges whether or not the second virtual host 2b is shut down. If the second virtual host 2b is not yet shut down, the first power supply 1 returns to step S57 and transmits an inquiry for confirming the shutdown of the second virtual host 2b. On the other hand, if the shutdown of the second virtual host 2b is confirmed, the first power supply 1 proceeds to step S59. In step S59, the first power supply 1 transmits a shutdown instruction to the virtual host other than the second virtual host 2b, i.e., the first virtual host 2a. In step S60, the first virtual host 2a starts its own shutdown processing.

In step S61, the first power supply 1 inquires the first virtual host 2a after transmitting the shutdown instruction to the first virtual host 2a in step S59. In step S62, the first power supply 1 judges whether or not the first virtual host 2a is shut down. If the first virtual host 2a is not yet shut down, the first power supply 2 returns to step S61 and transmits an inquiry for confirming the shutdown of the first virtual host 2a. On the other hand, if the shutdown of the first virtual host 2a is confirmed, then in step S63, the first power supply 1 transmits a shutdown instruction to the second power supply 5 feeding power to the application system 120. Further, in step S64, the first power supply 1 starts its own shutdown processing. Upon receiving the shutdown instruction from the first power supply 1, the second power supply 5 starts its own shutdown processing in step S65.

In the example of FIG. 4, the virtual hosts 6 of the application system 120 are shut down, then the second virtual host 2b running the virtualization management server in emulation is shut down, and thereafter the first virtual host 2a of the base system is shut down. However, the shutdown is not limited to this order. Moreover, the shutdown order may be determined based on the software that runs on the application system 120 and the software of the virtualization management server that is emulated on the application system 120. The information processing system 100 of the embodiment of the present invention only needs to be such that the first power supply 1 equipped with the virtualization management function can feed power to the second virtual host computer 2b, which runs the virtualization management server in emulation, and also perform the virtualization management thereof, and that the second virtual host computer 2b can perform the virtualization management of the application system 120.

Figure 5:
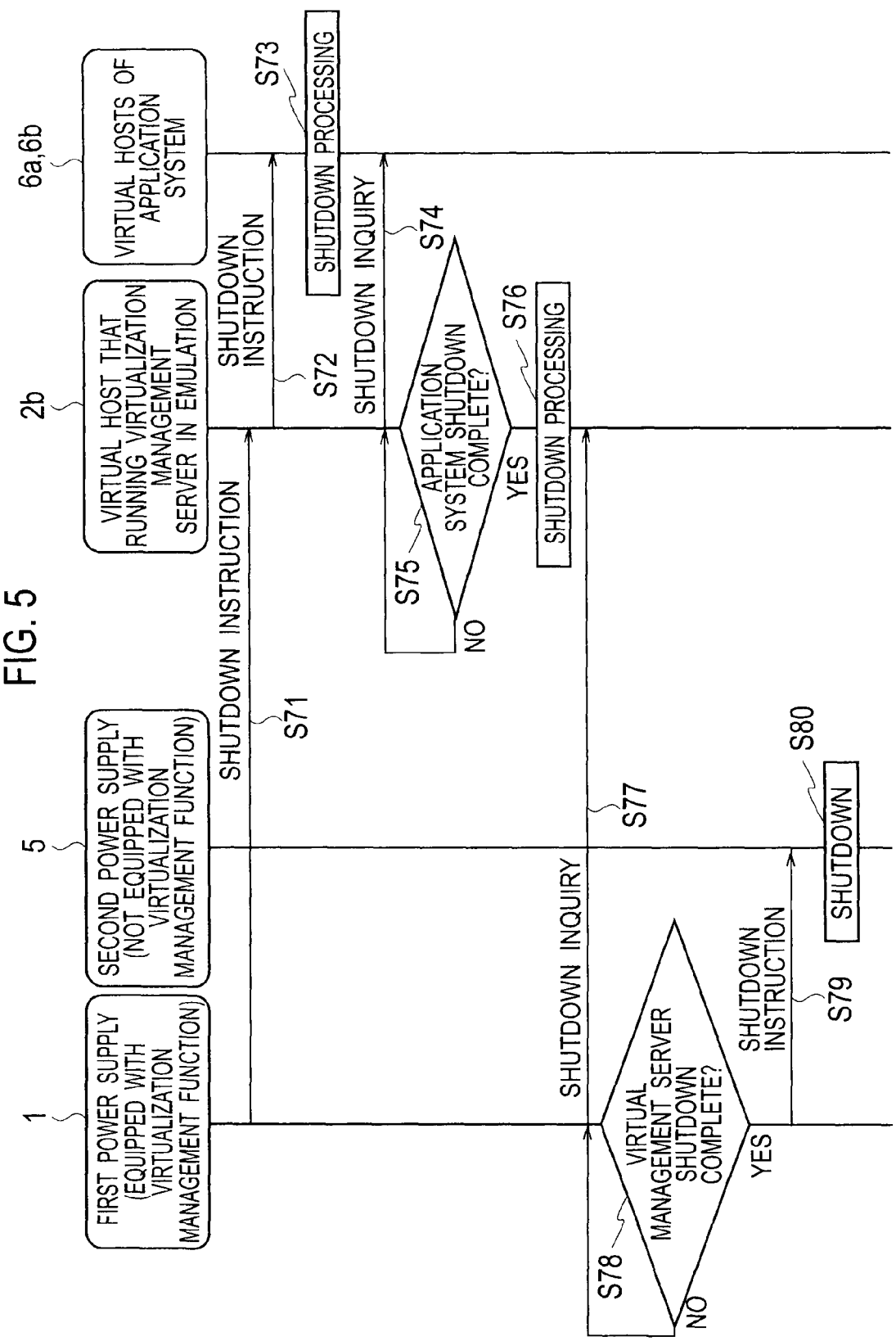
FIG. 5 is a diagram for describing processing performed at the time of shutting down the application system.

Referring to FIG. 5, description will be given of processing performed at the time of shutting down the application system 120 of the embodiment of the present invention. FIG. 5 describes processing for shutting down the devices of the application system 120 from a state where all the devices of the information processing system 110 have been booted.

First, in step S71, the first power supply 1 transmits a shutdown instruction to the second virtual host 2b running the virtualization management server in emulation. In step S72, the second virtual host 2b transmits a shutdown instruction to the virtual hosts 6 of the application system 120 which the second virtual host 2b is performing virtualization management on. In step S73, the virtual hosts 6 starts shutdown processing.

Thereafter, in step S74, the second virtual host 2b sequentially inquires the virtual hosts 6 and judges in step S75 whether or not the virtual hosts 6 of the application system 120 are shut down. If the application system 120 is not yet shut down, the second virtual host 2b returns to step S74 and transmits an inquiry for confirming the shutdown of the application system 120. On the other hand, if the shutdown of the application system 120 is confirmed, then in step S76, the second virtual host 2b running the virtualization management server in emulation starts its own shutdown processing.

The first power supply 1 proceeds to step S77 after transmitting in step S71 the shutdown instruction to the second virtual host 2b running the virtualization management server in emulation. In step S77, the first power supply 1 inquires the second virtual host 2b. In step S78, the first power supply 1 judges whether or not the second virtual host 2b is shut down. If the second virtual host 2b is not yet shut down, the first power supply 1 returns to step S77 and transmits an inquiry for confirming the shutdown of the second virtual host 2b. On the other hand, if the shutdown of the second virtual host 2b is confirmed, then in step S79, the first power supply 1 transmits a shutdown instruction to the second power supply 5 feeding power to the application system 120. Upon receiving the shutdown instruction from the first power supply 1, the second power supply 5 starts its own shutdown processing in step S80.

In the example of FIG. 5, the virtual hosts 6 of the application system 120 are shut down, and thereafter the second virtual host 2b running the virtualization management server in emulation is shut down. However, the shutdown in not limited to this order. Moreover, the shutdown order may be determined based on the software that runs on the application system 120 and the software of the virtualization management server that is emulated on the application system 120.

Here, in the example shown in FIG. 5, the processes of the steps S76, S77, and S78 may be omitted if the second virtual host 2b is not shut down after confirming the shutdown of the application system 120.

The information processing system 100 of the embodiment of the present invention only needs to be such that the first power supply 1 equipped with the virtualization management function can feed power to the second virtual host computer 2b, which runs the virtualization management server in emulation, and also perform the virtualization management thereof, and that the second virtual host computer 2b can perform the virtualization management of the application system 120.

Referring to FIGS. 6 to 10, description will be given of the first power supply 1 of the embodiment of the present invention. The first power supply 1 differs from conventional power supplies in that the first power supply 1 is equipped with the virtualization management function as shown in FIG. 1. The first power supply 1 includes a controller 10, a memory 20, a power feed unit 30, and a communication control device 40.

The power feed unit 30 is configured to feed power to the computer connected to the power supply 1. The power feed unit 30 includes multiple outlets and therefore can feed power to multiple computers. The communication control device 40 is a device for communicating with the other power supply, computers, and the like and is a LAN adapter, for example.

The memory 20 is a storage device configured to store: program data of a firmware program and the like that are executed on the power supply 1; data to be processed by the controller 10; and the like. The memory 20 has a storage area for the program data and also has a management target data storage unit 21, a power management data storage unit 22, and a VM management data storage unit 23. The embodiment of the present invention describes a case where the memory 20 of the first power supply 1 includes the management target data storage unit 21, the power management data storage unit 22, and the VM management data storage unit 23. However, the configuration is not limited to this. The data may not be stored in the memory 20 incorporated in the first power supply 1. For example, the data may be stored in an external storage unit such as a computer's hard disk drive or semiconductor memory from which the first power supply 1 can read data.

The management target data storage unit 21 is a storage area within the memory 20 in which management target data is stored. The management target data contains connection data 21a related to the power currently fed by the first power supply 1, and VM data 21b related to the current management target VMs of the first power supply 1.

In the management target data, information on the power management is provided for each outlet of the first power supply 1, and information on the virtualization management is provided for each VM. The information on the virtualization management may further contain information on the virtual host computers that run the VMs in emulation.

Here, in the embodiment of the present invention, "management target VMs" refer to the VMs that are run in emulation by the computers at the destinations of the power feed by the first power supply 1, and are the VMs that are controlled by the virtualization management function of the first power supply 1. For instance, in the example shown in FIG. 1, the management target VMs of the first power supply 1 are the first VM 3a, the second VM 3b, the third VM 3c, and the fourth VM 3d. Moreover, management target virtual hosts of the first power supply 1 refer to the virtual host computers that run the management target VMs of the first power supply 1 in emulation. In FIG. 1, the management target virtual hosts of the first power supply 1 are the first virtual host computer 2a and the second virtual host computer 2b. The first power supply 1 feeds power to the management target virtual hosts.

The management target data has data and data structures shown in FIGS. 7A and 7B, for example. FIG. 7A shows the connection data 21a as the information on the power management. In the connection data 21a, the identifier of each outlet serving as a key is associated with the identifier of the virtual host at the connection destination of the outlet. As shown in FIG. 7A, the connection data 21a may contain the identifier of the first power supply 1.

FIG. 7B shows the VM data 21b as the information on the virtualization management. In the VM data 21b, the identifier of each VM serving as a key is associated with the OS, address, net mask, user, and password of the VM. Besides these pieces of information, other necessary information may be associated with the identifier of the VM as well.

The power management data storage unit 22 is a storage area within the memory 20 in which power management data is stored. The power management data contains power supply data 22a shown in FIG. 8.

The power supply data 22a is data for controlling the current power feed. The power supply data 22a has a data structure as shown in FIG. 8, for example. The power supply data 22a of the embodiment of the present invention has items of power supply identifier, power supply's ON/OFF, outlet identifier, virtual host, type, input voltage, input frequency, output voltage, and output frequency.

In each of the items of power supply identifier and power supply's ON/OFF, there is set data on the current ON/OFF status of the power supply. Further, in each of the items of outlet identifier and virtual host, there is set data on the virtual host computers 2 at the current connection destinations of the outlets of the power supply. In each of the items of type, input voltage, input frequency, output voltage, and output frequency, there is set data on the running condition of the power supply.

The VM management data storage unit 23 is a storage area within the memory 20 in which VM management data is stored. The VM management data is data in which the identifier of each VM is associated with information on resources allocated to the VM. The VM management data contains resource data 23a shown in FIG. 9 and desired instruction data 23b shown in FIG. 10. Here, the identifiers of the virtual hosts and the identifiers of the VMs are each an IP address, for example.

The resource data 23a is data on the resources allocated to the VMs implemented by the virtual host computers connected to the outlets. As shown in FIG. 9, in the resource data 23a, the identifiers of each virtual host and its corresponding VM(s) are associated with information on the resources allocated to the VM(s). Besides these pieces of information, other necessary information may be associated with the identifier of the virtual host as well.

The desired instruction data 23b is instruction data for allowing the power supply to make a virtual host or a VM execute a desired command at a desired timing. In the desired instruction data 23b, the instruction target, the identifier of the instruction target, and the execution timing serving as keys are associated with the content of the command to be executed.

Figure 6:
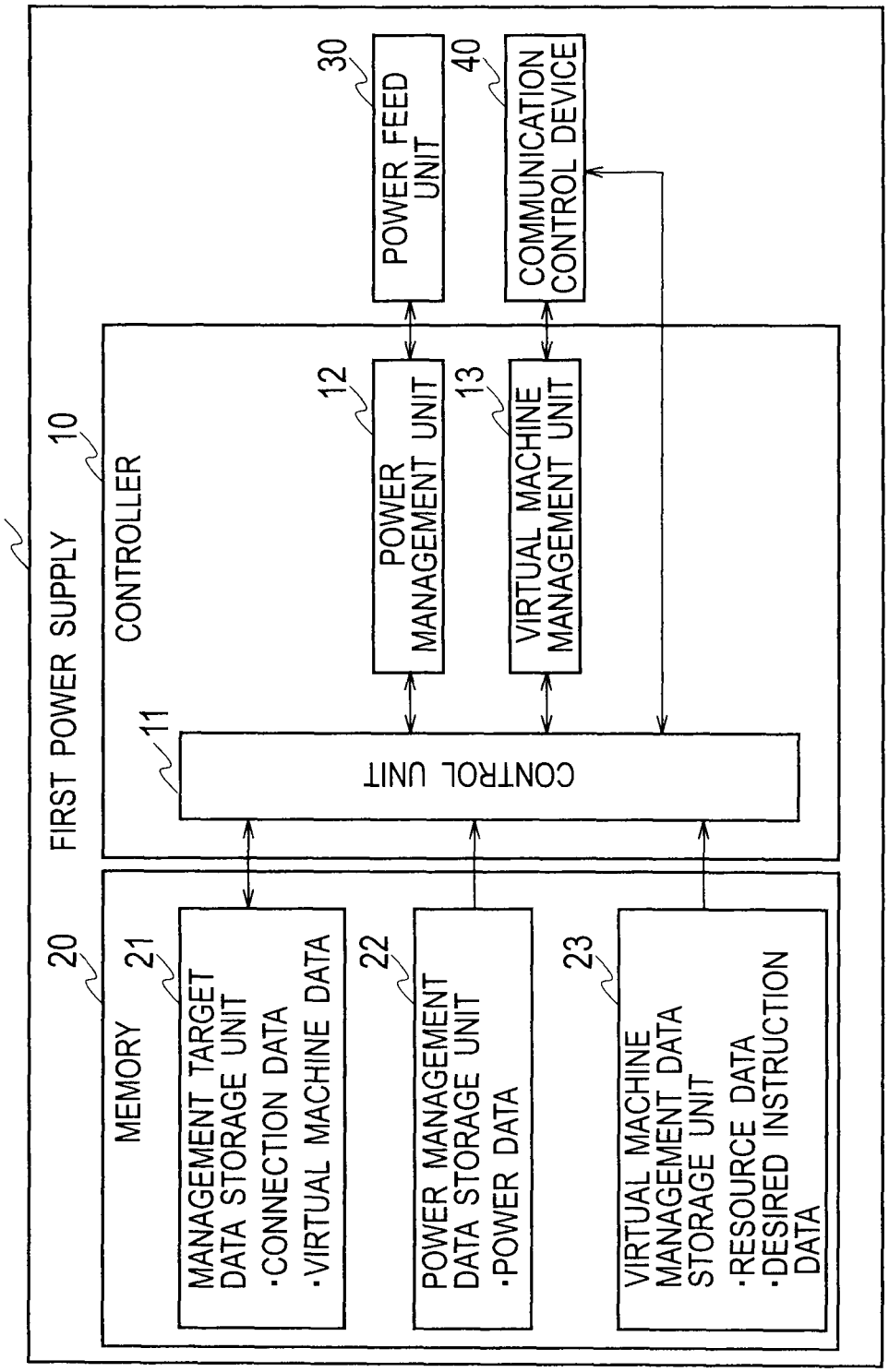
FIG. 6 is a functional block diagram of a power supply of the embodiment of the present invention.

The controller 10 shown in FIG. 6 is a processing control processor configured to execute predetermined processing in accordance with a program such as the firmware program. In the embodiment of the present invention, by executing the firmware program, a control unit 11, a power management unit 12, and a VM management unit 13 are implemented on the controller 10.

The control unit 11 is a unit configured to control the power management of the information processing system 100 and also to control the virtualization management of the base system 110. If necessary, the control unit 11 may read the power management data and the VM management data from the memory 20 and perform control on the basis of the power management data and the VM management data. In the embodiment of the present invention, the control unit 11 performs control in various situations such as control of the virtual host computers 2 and the VMs 3, and control of the transmission of execution commands to the virtual host computers 2 and the VMs 3. The control unit 11 inputs an instruction to at least one of the power management unit 12 and the VM management unit 13, and the at least one of the power management unit 12 and the VM management unit 13 executes the instruction. In some cases, the control unit 11 may input an instruction to the other power supply or the like through the communication control device 40.

In addition, when a change is made to the power management or the virtualization management, the control unit 11 creates management target data on the basis of the change and stores the created management target data in the management target data storage unit 21. The management target data contains the connection data 21a and the VM data 21b. The connection data 21a is information on the power management related to the power currently fed by the first power supply 1. The VM data 21b is information on the virtualization management related to the VMs that are run in emulation by the physical computers at the destination of the power feed by the first power supply 1.

The control unit 11 controls processing of the first power supply 1. Specifically, the control unit 11 performs control such that in the booting or shutdown of the information processing system 100, the second power supply 5, the devices of the base system 110, and the devices of the application system 120 can be booted or shut down at predetermined timings, as described with reference to FIGS. 2 and 5. The control unit 11 performs control such that an instruction is transmitted which instructs shutdown of the second virtual host 2b running in emulation the fourth VM 3d controlling the application system 120, after the application system 120 is shut down. Thereafter, the control unit 11 performs control such that an instruction is transmitted which instructs shutdown of the first virtual host 2a running in emulation the VMs 3a, 3b, 3c, . . . executing the functions necessary for running the application system 120. Here, "the functions necessary for running the application system 120" include functions such as boot of the power of the application system 120, shutdown of the power, transition to standby, and recovery from standby.

Meanwhile, the control unit 11 may transmit an instruction to shut down the application system 120 to the fourth VM 3d or second VM 3b executing the functions necessary for running the application system 120, and thereafter transmit a shutdown instruction to the second power supply 5 feeding power to the application system 120.

Specifically, the control unit 11 causes the VM management unit 13 to boot the VMs 3 on which the first power supply 1 performs virtualization management and also to acquire their boot statuses. Moreover, the control unit 11 causes the VM management unit 13 to shut down the VMs 3 and also to acquire their shutdown statuses. The control unit 11 transmits boot or shutdown instructions, acquires the boot or shutdown statuses, and so on, depending on the statuses of the devices.

Here, in a case of transmitting an instruction for the power management of the first power supply 1, the control unit 11 inputs the instruction to the power management unit 12 of the first power supply 1. In a case of transmitting an instruction to the fourth VM 3d on which the first power supply 1 performs virtualization management or to the virtual host 2b, the control unit 11 inputs the instruction to the VM management unit 13 of the first power supply 1. On the other hand, in a case of inputting an instruction to a device other than the above, the control unit 11 inputs the instruction to the device through the communication control device 40. In a case where the control unit 11 of the first power supply 1 is to input an instruction through the communication control device 40, the destination to transmit the instruction is the corresponding device of the application system 120, in the example shown in FIG. 1.

Meanwhile, in a case where the virtual host computers 2 or the VMs 3 need to execute desired commands at desired timings, the control unit 11 may input such information to the VM management unit 13.

The power management unit 12 is configured to control the feed of power to the computers on the basis of the power management data in which setting information on the power to be fed to the computers is stored. The power management unit 12 is a unit configured to control the power feed unit 30 in accordance with an instruction from the control unit 11. The power management unit 12 controls the feed of power to the virtual host computers 2 of the base system 110 on the basis of the power management data. For example, upon input of an instruction to shut down the first power supply 1 from the control unit 11, the power management unit 12 cuts the feed of power to the virtual host computers 2 of the base system 110 which the first power supply 1 is feeding power to. The power management unit 12 controls processing of the power feed unit 30 that is related to shutdown.

The VM management unit 13 is configured to control the virtualization management of the base system 110. The VM management unit 13 transmits an instruction to the VM 3 that is run in emulation by the virtual host 2 or to the virtual host 2 through the communication control device 40. Specifically, in the embodiment of the present invention, the VM 3 at the destination to which the VM management unit 13 transmits an instruction controls the virtualization management system including the virtual hosts 6 that are different from the virtual host 2. In the example shown in FIG. 1, this virtualization management system is the application system 120. Moreover, in the example shown in FIG. 1, the VM at the destination to which an instruction is transmitted is the fourth VM 3d that is run in emulation by the second virtual host computer 2b.

Here, the VM management unit 13 further transmits an instruction to the VM that executes the functions necessary for running the virtualization management system or to the virtual host that runs the VM in emulation. In the example shown in FIG. 1, the virtualization management of the application system 120 is performed by the fourth VM 3d that is run in emulation by the second virtual host computer 2b. Accordingly, when an instruction to execute the functions necessary for running the application system 120 is to be transmitted based on the control by the control unit 11, the VM management unit 13 transmits the instruction to the second virtual host computer 2b or the fourth VM 3d.

The information processing system of the embodiment of the present invention configured as above is suitable for a case of implementing the virtualization management function for the application system 120 by using a VM. Specifically, the virtualization management of the VM responsible for the virtualization management of the application system 120 is performed by the power supply that feeds power to the virtual host computer which runs that VM in emulation. Since the power supply performs the virtualization management of the virtualization management server used for virtualization management, appropriate virtualization management can be performed on the virtualization management server used for virtualization management. Moreover, that the power supply performs the virtualization management of the virtualization management server allows smooth operations of the virtualization management server such as increasing or decreasing the resources allocated to the virtual management server on the basis of the load on the virtualization management server.

Moreover, the power supply of the embodiment of the present invention is configured to feed power to devices related to the infrastructures of the application system 120 such as the virtualization management server for the virtualization management of the application system 120 and a server related to network management, and also to perform the virtualization management of these devices. By separating the operation of the application system 120 as a business system and the operation of the application system 120 as an infrastructure system as described above, the application system 120 can be booted and shut down appropriately.

Moreover, the power supply of the embodiment of the present invention can be introduced easily to an existing application system 120. Specifically, a power supply that feeds power to the virtualization management server which controls the virtualization management of the application system 120 may be changed to the power supply of the embodiment of the present invention; in this way, the virtualization management of the virtualization management server can be performed in a separate system.

With the power supply performing the virtualization management as described above, both power feed and virtualization management can be smoothly performed, and the reliability of the virtualization management can be improved.

Other Embodiments

Although the description has been given using the embodiment of the present invention, it should not be understood that the statement and drawings constituting part of this disclosure limit this invention. Various alternative embodiments, examples, and operation techniques become apparent to those skilled in the art from this disclosure.

The present invention includes various embodiments and the like that are not described herein, as a matter of course. Therefore, the technical scope of the present invention shall be determined solely by the specified matters in the invention according to the claims that are appropriate from the above description.

What is claimed is:

1. A power supply used in an information processing system wherein
the information processing system comprises a base system and an application system,
the power supply feeds power to a first computer comprised in the base system,
the application system comprises an application computer and a second power supply, the second power supply feeds power to the application computer,
the first computer and the application system communicate with each other, and the first computer runs a first VM in emulation,
the application computer runs a second VM in emulation, and
the first VM controls the second VM,
the power supply comprising:
a power manager to control a feed of power to the first computer,
a VM manager to control the first VM, and
a controller,
the controller
transmits a first shutdown instruction to the first computer,
transmits an inquiry of the shutdown of the first computer,
after confirmation of the shutdown of the first computer, transmits a second shutdown instruction to the second power supply and inputs a third shutdown instruction to the power manager to shut down the power supply.

2. The power supply according to claim 1, wherein
the base system comprises a second computer, the power supply feeds power to the second computer,
the second computer runs a third VM in emulation, the third VM assigns IP address to the application computer, and
the controller
after the confirmation of the shutdown of the first computer, transmits a forth shutdown instruction to the second computer,
transmits another inquiry of the shutdown of the second computer, and
inputs the third shutdown instruction after confirmation of the shutdown of the second computer and transmitting the second shutdown instruction.

3. A method of supplying power to an information processing system, the information processing system having a base system and an application system, the method comprising:
feeding power from a first power supply to a first computer of the base system;
feeding power from a second power supply to an application computer of the application system;
running a first VM in emulation on the first computer, the first computer communicatively linked with the application system;
running a second VM in emulation on the application computer;
controlling the second VM with the first VM,
wherein the first power supply includes a power manager, controller and a VM manager,
controlling a feed of power to the first computer via the power manager;
controlling the first VM via the VM manager; and
controlling via the controller the transmission of a first shutdown instruction to the first computer;
transmitting an inquiry of the shutdown of the first computer;
transmitting, after confirmation of the shutdown of the first computer, a second shutdown instruction to the second power supply; and
inputting a third shutdown instruction to the power manager to shut down the power supply.

4. The method of claim 3, wherein the base system comprises a second computer, the power supply feeds power to the second computer,
running a third VM in emulation on the second computer;
assigning, by the third VM, an IP address to the application computer:
controlling by the controller, after the confirmation of the shutdown of the first computer, a transmission of a fourth shutdown instruction to the second computer;
transmitting another inquiry of the shutdown of the second computer from the controller; and
communicating the third shutdown instruction from the controller, after confirmation of the shutdown of the second computer, and transmitting the second shutdown instruction from the controller.

* * * * *